Patented Oct. 12, 1926.

1,602,456

UNITED STATES PATENT OFFICE.

ARTHUR RITZ, OF CHICAGO, ILLINOIS, ASSIGNOR TO SUPERIOR CHEMICAL PRODUCTS CORPORATION, A CORPORATION OF ILLINOIS.

CHEMICAL-HEAT BAG.

No Drawing.     Application filed January 24, 1923. Serial No. 614,681.

This invention relates to the provision of a chemical material for producing mild, prolonged heat by reason of chemical action, and has for its principal object the provision of a material for accomplishing this result, which will not produce obnoxious odor as an incident to the evolution of the heat. A principal use of the invention is in connection with heat bags, foot warmers, and the like.

I am aware that prior to my invention it has been attempted to produce prolonged, gentle heat by the resulting reactions attained upon introducing water or moisture into a combination of iron particles and ammonium chloride. Heat thus produced is attended by the evolution of obnoxious ammonia fumes. Since these heat bags have wide use in sick rooms and elsewhere as substitutes for the ordinary quick cooling hot water bottle, the giving off of ammonia odors becomes peculiarly annoying and in many circumstances has prevented the use of bags containing the materials just above mentioned.

I have discovered that other salts, not containing ammonia, may be advantageously employed, the invention contemplating in this regard the production of a material formed by mixing together substances which will evolve heat upon the addition of moisture and produce, as an incident to the chemical actions entering into the operation, merely solid residues.

A preferred example of such material is a mixture composed essentially of calcium chloride and iron particles. The action which takes place is the expedition of the rusting of the iron by the creating of nascent oxygen from electrolysis. This is the ordinary action in the rusting of iron, the electrolyte then being the impure moisture and the couple being completed by the iron itself and the impurities of the iron or an iron oxide or both. This electrolytic couple breaks down the moisture generating nascent oxygen adapted to attack the iron and form an oxide of the iron. Where the ammonium salt above mentioned is used, this electrolytic action liberates ammonia and chlorine, the ammonia passing off in fumes and the chlorine attacking the iron to form a chloride of iron. Where, however, calcium is used as suggested, the separation of the calcium and the chlorine produces two solid substances, namely, calcium oxide and a chloride of iron.

In order for the heat to be produced and the electrolysis to proceed it is necessary that the salt be soluble in water, and while I have selected calcium chloride as the preferred material I do not desire to be understood as confining the invention thereto but believe that it is entitled to include all soluble salts, which, upon the addition of moisture, will enter into solution to expedite the chemical action and leave solid residues, other examples of such salts being magnesium chloride and ferric chloride. I find also that the action is somewhat improved by the treatment of the iron with a few drops of hydrochloric acid prior to the forming of the material mixture. This is, however, not absolutely necessary, particularly if the iron contains considerable impurity. The function of the hydrochloric acid is to produce a modicum of a chloride of iron to enter into the initial electrolytic couple. A preferred mixture consists of a pound of iron particles, preferably finely comminuted, and $\frac{1}{4}$ ounce of calcium chloride. Substances in addition to iron and ammonium chloride have been incorporated in said mixtures and these I may or may not include. However, I have found it advisable to use sulphur and table salt in addition to the iron and calcium chloride in commercial practice. My complete formula is preferably,—

Iron particles 1 pound, calcium chloride $\frac{1}{8}$ ounce, sulphur 1 dram, sodium chloride 1 dram.

It would at first be supposed that the hydroscopic quality of the calcium chloride would preclude its use in connection with the iron filings since it would be supposed that this material would take up moisture from the air with sufficient rapidity to soon exhaust the bags, but I have discovered that this is a negligible consideration, the material resulting from the mixture above described being durable and entirely satisfactory.

I claim:

1. A material for chemically generating a mild prolonged heat when mixed with water, comprising, iron particles, and an accelerator for expediting chemical action on the iron, said accelerator being soluble in water and adapted in the chemical action to have its components converted only into nongaseous substances.

2. A material for generating a mild prolonged heat when mixed with water, comprising, iron particles, and an accelerator for expediting chemical action on the iron particles, said accelerator comprising a soluble metallic salt adapted to accelerate chemical action without generating gaseous substances.

3. A material for chemically generating a mild prolonged heat, comprising, iron particles and calcium chloride.

4. A mixture for producing heat by chemical action, comprising, one pound iron particles, one-eighth ounce calcium chloride, one dram sulphur, and one dram sodium chloride.

5. A mixture for producing heat by chemical action, comprising, one pound metal, which is principally iron, one dram sulphur, one dram sodium chloride, and calcium chloride.

6. A mixture for producing heat by chemical action with water, comprising, one pound metal particles containing iron, one-eighth ounce calcium chloride, sulphur, and sodium chloride.

ARTHUR RITZ.